US011138219B2

(12) United States Patent
Suzuki et al.

(10) Patent No.: US 11,138,219 B2
(45) Date of Patent: Oct. 5, 2021

(54) DATABASE MANAGEMENT SYSTEM, DATABASE MANAGEMENT METHOD, AND DATABASE MANAGEMENT PROGRAM

(71) Applicant: DENDRITIK DESIGN, INC., Tokyo (JP)

(72) Inventors: Takayuki Suzuki, Kanagawa (JP); Kazutami Arimoto, Kobe (JP); Kenji Miyakubi, Tokyo (JP)

(73) Assignee: DENDRITIK DESIGN, INC., Tokyo (JP)

( * ) Notice: Subject to any disclaimer, the term of this patent is extended or adjusted under 35 U.S.C. 154(b) by 0 days.

(21) Appl. No.: 17/043,509

(22) PCT Filed: Mar. 9, 2020

(86) PCT No.: PCT/JP2020/010126
§ 371 (c)(1),
(2) Date: Sep. 29, 2020

(87) PCT Pub. No.: WO2020/217748
PCT Pub. Date: Oct. 29, 2020

(65) Prior Publication Data
US 2021/0124749 A1    Apr. 29, 2021

(30) Foreign Application Priority Data

Apr. 22, 2019 (JP) .............................. JP2019-081074

(51) Int. Cl.
*G06F 16/00* (2019.01)
*G06F 16/25* (2019.01)
(Continued)

(52) U.S. Cl.
CPC ........ *G06F 16/252* (2019.01); *G06F 16/2282* (2019.01); *G06F 16/245* (2019.01); *G06F 16/248* (2019.01); *G06F 16/282* (2019.01)

(58) Field of Classification Search
CPC .... G06F 16/248; G06F 16/245; G06F 16/252; G06F 16/2282; G06F 16/282
See application file for complete search history.

(56) References Cited

U.S. PATENT DOCUMENTS

2001/0051939 A1* 12/2001 Yoshimura .......... G06F 16/2358
2009/0012932 A1*  1/2009 Romem ............. G06F 16/2282
(Continued)

FOREIGN PATENT DOCUMENTS

JP    H04-274534 A    9/1992
JP    2001-134597 A    5/2001
(Continued)

*Primary Examiner* — Cheryl Lewis
(74) *Attorney, Agent, or Firm* — Paratus Law Group, PLLC

(57) ABSTRACT

A database management system according to one embodiment includes at least one processor configured to control a hierarchical database including a plurality of end databases and a primary database directly or indirectly connected to the plurality of end databases. Each of the plurality of end databases stores sensor data. The primary database provides a virtual data table. The at least one processor transmits, to the end database, a search instruction for obtaining a result set containing a combination of an intermediate result based on the sensor data and a path ID for uniquely identifying a path connecting the primary database and the end database, receives a result set, and represents a search result based on the result set by the virtual data table and outputs the search result.

9 Claims, 20 Drawing Sheets

(51) Int. Cl.
*G06F 16/245* (2019.01)
*G06F 16/22* (2019.01)
*G06F 16/28* (2019.01)
*G06F 16/248* (2019.01)

(56) References Cited

U.S. PATENT DOCUMENTS

2012/0278334 A1* 11/2012 Abjanic ................ G06F 16/25
                                                          707/741
2013/0110873 A1* 5/2013 Romem ............. G06F 16/2282
                                                          707/771

FOREIGN PATENT DOCUMENTS

| JP | 2007-184850 A | 7/2007 |
| JP | 2010-224672 A | 10/2010 |
| JP | 2011-222045 A | 11/2011 |
| JP | 2011-238179 A | 11/2011 |
| WO | WO 2017/013758 A1 | 1/2017 |
| WO | WO 2019/031006 A1 | 2/2019 |

* cited by examiner

Fig.4

| RECORD ID | TIME AND DATE | SENSOR A | SENSOR B | SWITCH C | ... |
|---|---|---|---|---|---|
| ... | ... | ... | ... | ... | ... |
| ... | ... | ... | ... | ... | ... |
| ... | ... | ... | ... | ... | ... |

91 — 6000 RECORDS

| RECORD ID | PERIOD | SENSOR A MAXIMUM VALUE | SENSOR A MINIMUM VALUE | SENSOR A TOTAL VALUE | SENSOR A SUM OF SQUARES | ... |
|---|---|---|---|---|---|---|
| ... | ... | ... | ... | ... | ... | ... |
| ... | ... | ... | ... | ... | ... | ... |
| ... | ... | ... | ... | ... | ... | ... |

92 — 6000 RECORDS

DATABASE MANAGEMENT SYSTEM, DATABASE MANAGEMENT METHOD, AND DATABASE MANAGEMENT PROGRAM

CROSS REFERENCE TO PRIOR APPLICATION

This application is a National Stage Patent Application of PCT International Patent Application No. PCT/JP2020/010126 (filed on Mar. 9, 2020) under 35 U.S.C. § 371, which claims priority to Japanese Patent Application No. 2019-081074 (filed on Apr. 22, 2019), which are all hereby incorporated by reference in their entirety.

TECHNICAL FIELD

One aspect of the present disclosure relates to a database management system, a database management method, and a database management program.

BACKGROUND ART

A hierarchical database is known that includes a plurality of databases that store data (sensor data) obtained from a sensor. For example, Patent Literature 1 discloses a cognitive communication system using a technique of organizing, into a networked and hierarchical structure, database devices for managing frequency usage situations for a wireless communication system that implements cognitive radio. This cognitive communication system includes a wireless communication system composed of a detection device that detects the usage situation of the ambient radio frequency, and a first database device that stores the frequency usage situation detected by the detection device, and a second database device that integrates one or more first database devices.

CITATION LIST

Patent Literature

PTL1: JP 2007-184850 A

SUMMARY OF INVENTION

Technical Problem

There are cases where the number of databases that store sensor data is enormous, and analyzing a massive amount of sensor data causes an excessive increase in load on a database management system. There is thus a demand for a database management system capable of performing efficient operations on sensor data.

Solution to Problem

A database management system according to one aspect of the present disclosure includes at least one processor configured to control a hierarchical database including a plurality of end databases, each connected to a sensor, and a primary database directly or indirectly connected to the plurality of end databases. Each of the plurality of end databases stores sensor data based on a signal from the sensor. The primary database provides a virtual data table representing a search result based on the sensor data. The at least one processor performs: acquiring a query for obtaining the search result; transmitting a search instruction corresponding to the query to at least one end database among the plurality of end databases, the search instruction being an instruction signal for obtaining a result set containing a combination of an intermediate result based on the sensor data and a path ID being an identifier for uniquely identifying a path connecting the primary database and the end database; receiving at least one result set corresponding to the at least one end database; representing the search result based on the at least one result set by the virtual data table; and outputting the search result represented by the virtual data table.

According to this aspect, sensor data corresponding to a query is collected in the primary database together with a path ID indicating a path connecting the primary database and the end database, and a search result based on this collected sensor data is represented by the virtual data table and output. Since actual sensor data is stored only in the end database, and the primary database represents the search result by the virtual data table, a storage area for storing the actual sensor data is reduced as a whole in the hierarchical database. Further, a source of sensor data, i.e., an information source, is identifiable by the path ID. This architecture enables efficient operations on sensor data.

Advantageous Effects of Invention

According to one aspect of the present disclosure, efficient operations on sensor data can be achieved.

BRIEF DESCRIPTION OF DRAWINGS

FIG. 4 is a view showing an example of sensor data;

DESCRIPTION OF EMBODIMENTS

An embodiment of the present disclosure is described hereinafter with reference to the attached drawings. Note that, in the description of the drawings, the same or similar elements are denoted by the same reference symbols and redundant description thereof is omitted.

Overview of System

A database management system 1 according to an embodiment is a computer system that controls a hierarchical database. The hierarchical database is a database structure generated by organizing a plurality of databases into a hierarchical tree structure. In this embodiment, the hierarchical database at least includes a plurality of end databases (end DBs), each of which is connected to a sensor, and one primary database (primary DB). The hierarchical database may further include one or more intermediate databases (intermediate DB) located between the primary database and the end database in a tree structure. The primary database is located in the highest layer, the end database is located in the lowest layer, and the intermediate database is located in an intermediate layer.

The database management system 1 is capable of processing sensor data based on signals from one or more sensors. The sensor is an element or device that detects a phenomenon in the real world and converts the detected phenomenon into a signal that can be processed by a computer. The type of a phenomenon to be detected by a sensor is not particularly limited. For example, the phenomenon may be any natural phenomenon or any phenomenon occurring artificially. Accordingly, the type of the sensor to be managed by the database management system 1 is not particularly limited. The sensor data is electronic data generated on the basis of signals. Since the type of the sensor is not particularly limited, the details of information indicated by the sensor data are also not particularly limited. The database management system 1 is able to perform data operations such as search on the sensor data stored in the hierarchical database. Further, the database management system 1 is able to perform processing for managing the hierarchical database.

Hierarchical Database

Figure 1:
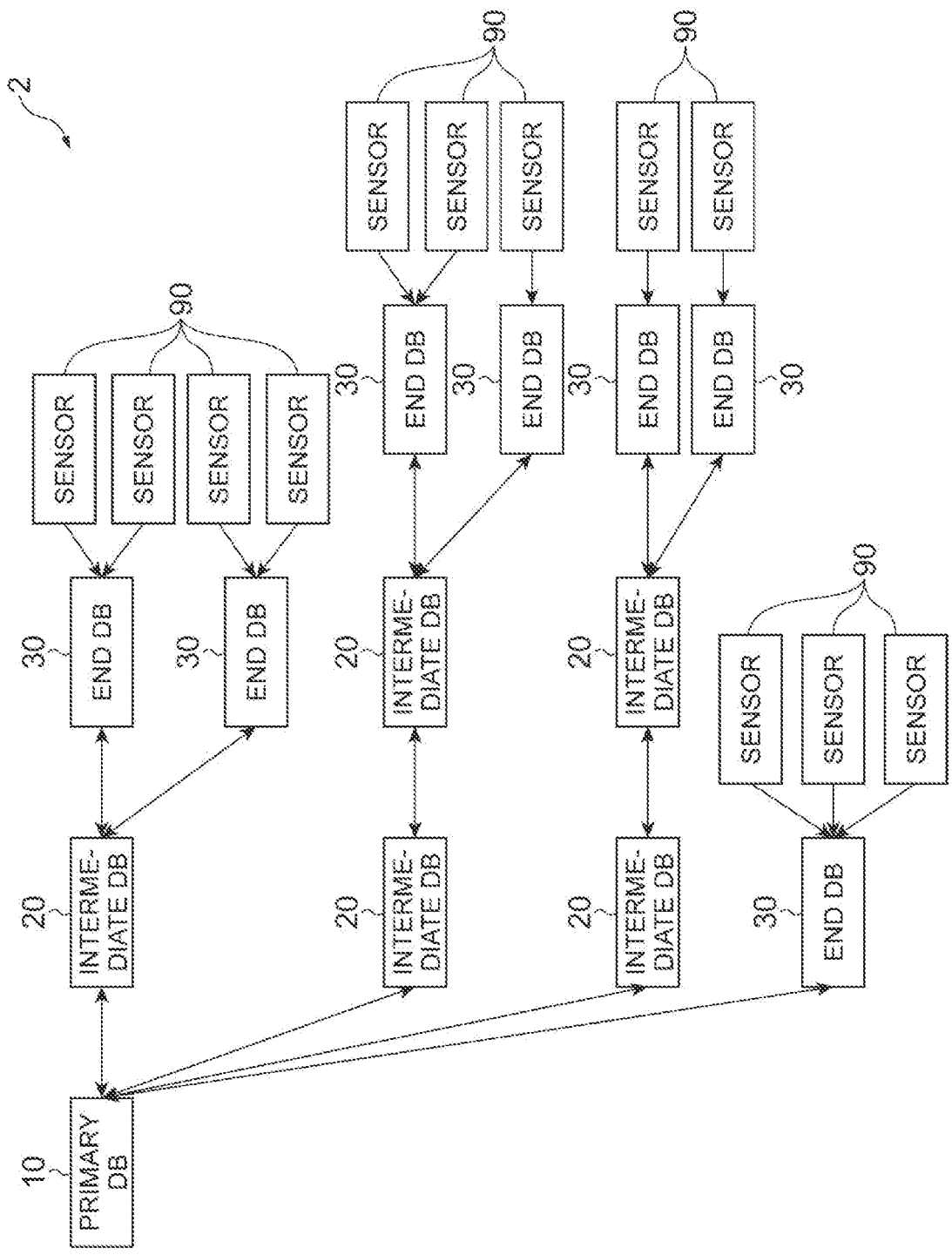
FIG. 1 is a view showing an example of the structure of a hierarchical database.

FIG. 1 is a view showing an example of the structure of a hierarchical database 2. In this example, the hierarchical database 2 includes a part (two-layer part) where a primary database 10 is connected directly to an end database 30 and a part (three- or four-layer part) where the primary database 10 is connected to the end database 30 through at least one intermediate database 20. In this manner, the primary database 10 may be connected directly to the end database 30 or may be connected indirectly through one or more intermediate databases 20. The number of intermediate databases 20 interposed between the primary database 10 and a certain end database 30 is not limited. In this way, the hierarchy of the hierarchical database 2 may be set flexibly.

Figure 2:
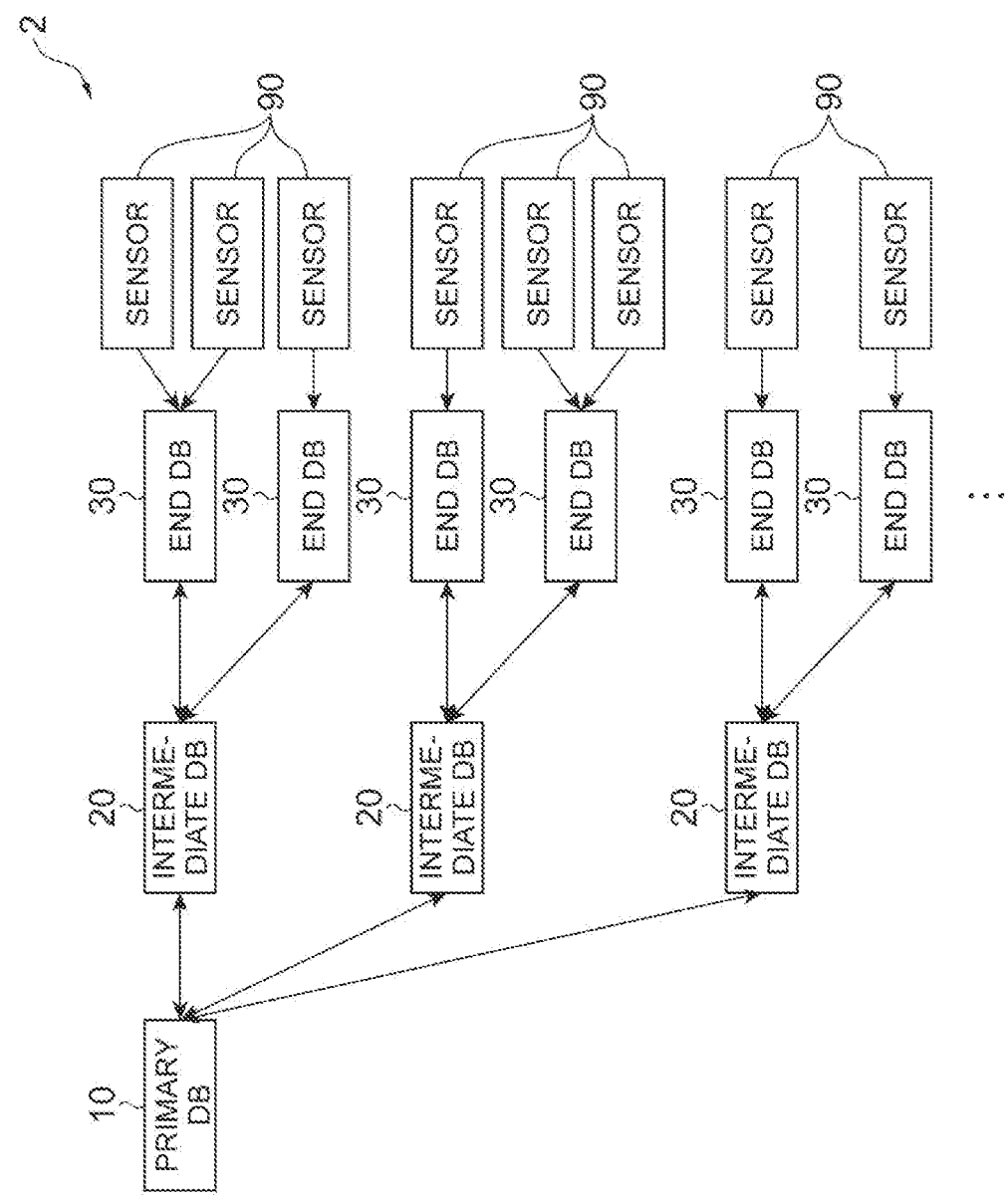
FIG. 2 is a view showing another example of the structure of a hierarchical database.

FIG. 2 is a view showing another example of the structure of the hierarchical database 2. In this example, the primary database 10 and each of a plurality of end databases 30 are connected through one intermediate database 20, and therefore the whole of the hierarchical database 2 has a three-level architecture. In this manner, the hierarchy of the hierarchical database 2 may be fixed.

The number of databases (the intermediate databases 20 or the end databases 30) that are directly connected to the primary database 10 is not limited regardless of whether the hierarchy of the hierarchical database 2 is flexible or fixed. The number of databases (the intermediate databases 20 or the end databases 30) in the immediately lower level that are connected to one intermediate database 20 is also not limited. The number of sensors 90 that are connected to one end database 30 is also not limited.

The primary database 10 is a database that provides a final search result based on sensor data. The intermediate database 20 is a database that is located on a path connecting the end database 30 and the primary database 10 for search. The path is a data path connecting the primary database 10 and one end database 30 without loopback. Each path is uniquely identified by an identifier called a path ID. The intermediate database 20 provides an intermediate result of a search to the primary database 10. The end database 30 is a database that stores sensor data. The end database 30 is connected to one or more sensors, and permanently stores information provided from sensors as sensor data. Only one type of sensor, or a plurality of types of sensors may be connected to one end database 30. None of the primary database 10 and the intermediate database 20 permanently stores sensor data.

Figure 3:
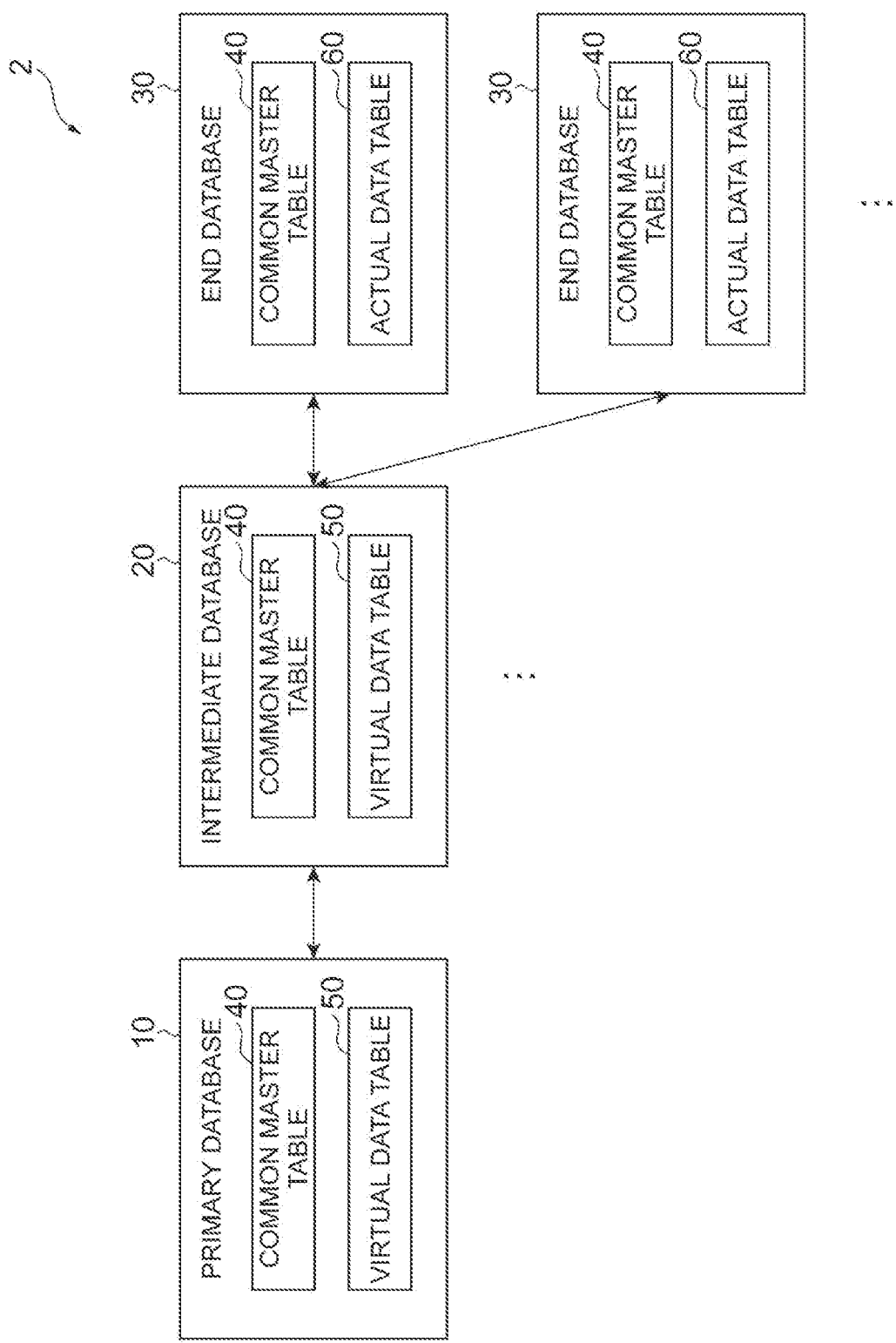
FIG. 3 is a view showing an example of a table structure in a hierarchical database.

FIG. 3 is a view showing an example of a table structure in the hierarchical database 2. Each of the primary database 10 and the intermediate database 20 includes at least one common master table 40 and at least one virtual data table 50. The end database 30 includes at least one common master table 40 and at least one actual data table 60.

The common master table 40 is a storage area that stores information necessary for control of the hierarchical database 2. The details of master data, which is information to be stored in the common master table 40, are not limited, and may be set arbitrarily. For example, the master data may indicate information (e.g., identifier, name, manufacturer name etc.) about a sensor, or may indicate a rule for converting a numerical value obtained from a sensor into another numerical value. Each of the common master tables 40 is identical among all databases in the hierarchical database 2. Operations (create new, update, delete, etc.) on the common master table 40 are performed on the initiative of the primary database 10. Each of the common master tables 40 is implemented in each database in association with a version number indicating the stage of a change in this table.

The virtual data table 50 is a virtual storage area that represents a search result based on sensor data. The virtual data table 50 does not store actual data, and it can be regarded as a "view". The virtual data table 50 shows a collection of data in one or more databases located in the immediately lower level as if it is a single table. The table structure (the structure of records, the data type of each column, the maximum number of records, etc.) of each virtual data table 50 is identical among all databases in the hierarchical database 2. The data structure of the virtual data table 50 is not limited, and it may be designed arbitrarily. Each record of the virtual data table 50 may contain a path ID. The path ID may be a column that is recognizable by a user, or a column for internal processing that is not recognized by a user. Operations (create new, update, delete, etc.) on the virtual data table 50 are performed on the initiative of the primary database 10.

The actual data table 60 is a storage area that permanently stores sensor data. The data structure of the actual data table 60 is not limited, and it may be designed arbitrarily. The table structure (the structure of records, the data type of each column, the maximum number of records, etc.) of each actual data table 60 is the same as that of the corresponding virtual data table 50. Each record of the actual data table 60 contains a path ID. The path ID may be recognizable by a user, or may be for internal processing in correspondence with the virtual data table 50. Operations (create new, update, delete, etc.) on the actual data table 60 are performed on the initiative of the primary database 10. Sensor data in the actual data table 60 can be added, updated, or deleted by the end database 30.

The virtual data table 50 and the actual data table 60 may be a cyclic table. The cyclic table is a table where the number of storable records is predetermined. In the cyclic table, data is managed by a rule such as FIFO (First In, First Out) or LIFO (Last In, First Out). Specifically, when the maximum number of records is exceeded, one specific record is overwritten with a record to be added based on the rule. Columns in the cyclic table may be set to a fixed length. Since columns are set in this way, the total data size of each record is the same, which prevents fragmentation of a memory caused by deviation in memory layout.

The virtual data table 50 and the actual data table 60 corresponding to each other can be generated by a common SQL. For example, by the SQL "CREATE CYCLIC TABLE V_TBL value INT LIMIT_RECORDS 1000", the virtual data table 50 called "V_TBL", which is a cyclic table capable of holding 1000 records at maximum, may be generated on the primary database 10 and the intermediate database 20, and the actual data table 60 having the same table structure may be generated on the end database 30. Note that while the actual data table 60 stores sensor data permanently, the virtual data table 50 represents sensor data temporarily and does not store sensor data permanently.

FIG. 4 is a view showing an example of sensor data. A record of sensor data 91 contains a record ID, which is an identifier for uniquely identifying a record in a table, time and date when the record is recorded, and one or more values corresponding to one or more sensors (sensor A, sensor B, switch C etc.), A record of sensor data 92 contains a record ID, a statistical period, and statistical values (maximum value, minimum value, total value, sum of squares, etc.) related to the sensor data 91 in the statistical period. In the example of FIG. 4, only columns related to the sensor A are shown for the sensor data 92. Assuming that the maximum number of records of each of the sensor data 91 and 92 is 6000, and the sensor data 91 is recorded every one second, the sensor data 91 shows a history of last 100 minutes. In the case where the history of 100 minutes is statistically processed every 100 minutes by a stored procedure implemented in the end database 30, the sensor data 92 shows statistical values for 400 days or more.

Figure 5:
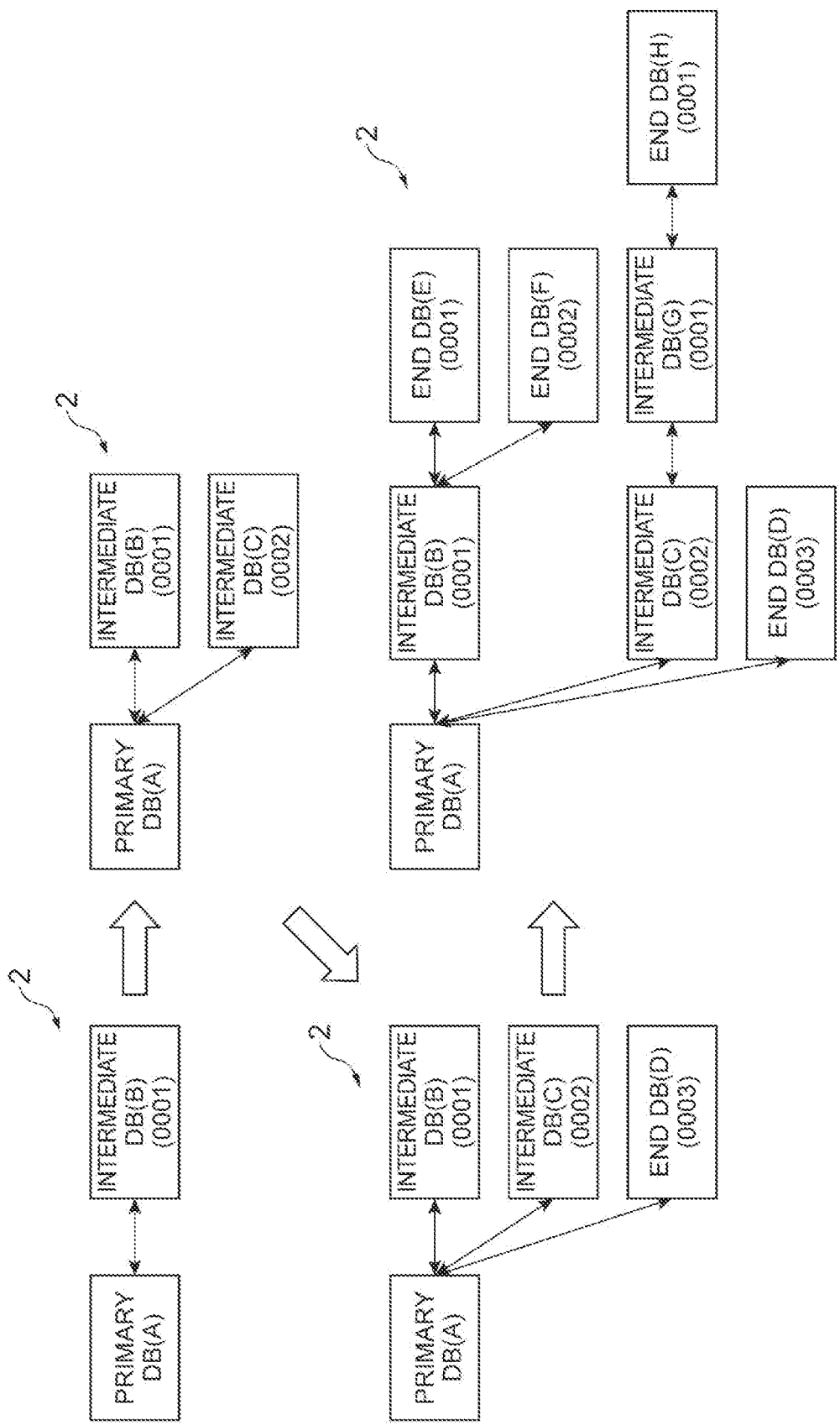
FIG. 5 is a view showing an example of a hierarchical database construction method.

FIG. 5 is a view showing an example of a method of constructing the hierarchical database 2. In this example, databases are distinguished by alphabetical letters such as (A) and (B) according to need.

First, a primary database (A) is prepared. One intermediate database (B) is connected to this primary database (A), and a database ID "0001" is assigned to this intermediate database (B). The database ID in the present disclosure is an identifier of a database that is assigned to the intermediate database 20 and the end database 30, and it is determined so as to uniquely identify a path from the primary database 10 to the end database 30, A method of setting a specific value of the database ID is not limited, and the database ID may be set by an arbitrary policy. For example, the database ID may be set to a value obtained by representing a 2-byte number by a 4-byte character string in a hexadecimal form. In this case, 65536 ($=2^{16}$) number of databases at maximum can be connected in a level immediately lower than the level of the primary database 10 or a certain intermediate database 20.

Next, an intermediate database (C) is connected to the primary database (A), and a database ID "0002" is assigned to this intermediate database (C). Then, an end database (D) is connected to the primary database (A), and a database ID "0003" is assigned to this end database (D). In this manner, the database IDs may be assigned sequentially without distinguishing between the intermediate database 20 and the end database 30.

When connecting lower-level databases as well, the database IDs are assigned to those databases in the same manner. In the example of FIG. 5, end databases (E) and (F) are connected to the intermediate database (B), a database ID "0001" is assigned to the end database (E), and a database ID "0002" is assigned to the end database (F). An intermediate database (G) is connected to the intermediate database (C), and a database ID "0001" is assigned to the intermediate database (G). An end database (H) is connected to the intermediate database (G), and a database ID "0001" is assigned to the end database (H).

As shown in FIG. 5, a plurality of databases in the hierarchical database 2 may have the same database ID unless the database ID does not overlap between one or more databases located in a level immediately lower than the level of a certain higher-level database. In this case also, a path connecting the primary database 10 and the end database 30 is uniquely identifiable. Note that a method of assigning the database ID is not limited to the example shown in FIG. 5, and each database ID may be unique in the hierarchical database 2, for example.

System Configuration

The database management system 1 at least includes the primary database 10, and may further include at least one of the intermediate database 20 and the end database 30.

Figure 6:
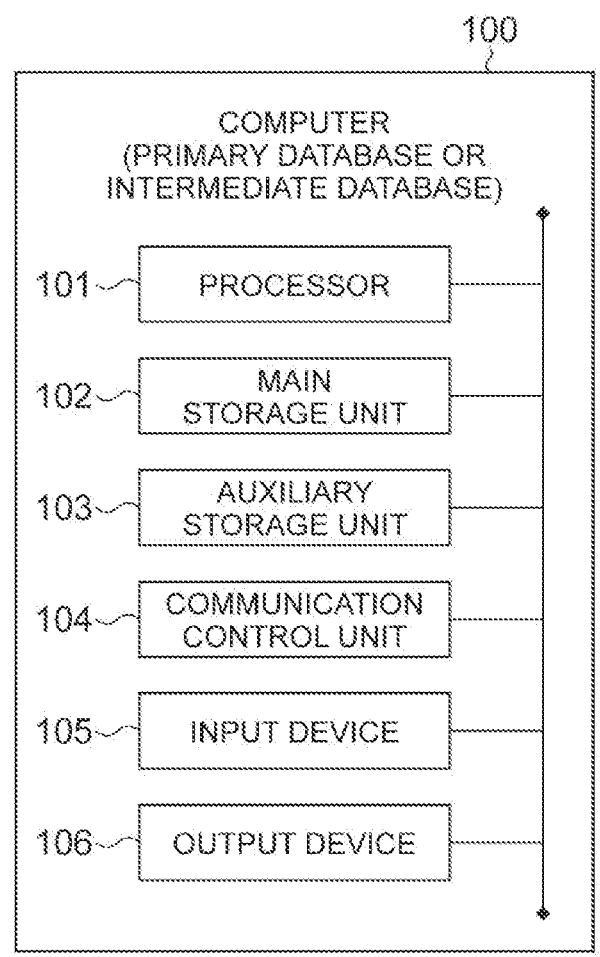
FIG. 6 is a view showing an example of a typical hardware configuration of a computer that constitutes a primary database or an intermediate database.

FIG. 6 is a view showing an example of a typical hardware configuration of a computer 100 that constitutes the primary database 10 or the intermediate database 20. For example, the computer 100 includes a processor 101, a main storage unit 102, an auxiliary storage unit 103, a communication control unit 104, an input device 105, and an output device 106. The processor 101 runs an operating system and an application program. The main storage unit 102 is ROM and RAM, for example. The auxiliary storage unit 103 is a hard disk or a flash memory, for example, and it generally stores a larger volume of data than the main storage unit 102. The tables are built on the auxiliary storage unit 103. The auxiliary storage unit 103 stores a program causing the computer 100 to function as the primary database 10 or the intermediate database 20. The communication control unit 104 is a network card or a wireless communication module, for example, and it is used for data communication with the primary database 10, the intermediate database 20, or the end database 30. The input device 105 is a keyboard, a mouse, a touch panel or the like, for example. The output device 106 is a monitor and a speaker, for example.

The functional elements of the primary database 10 or the intermediate database 20 are implemented by a program previously stored in the auxiliary storage unit 103. To be specific, the functional elements are implemented by loading the program onto the processor 101 or the main storage device 102 and running this program on the processor 101. The processor 101 makes the communication control device 104, the input device 105 or the output device 106 operate in accordance with the program, and reads and writes data to and from the main storage device 102 or the auxiliary storage device 103.

Figure 7:
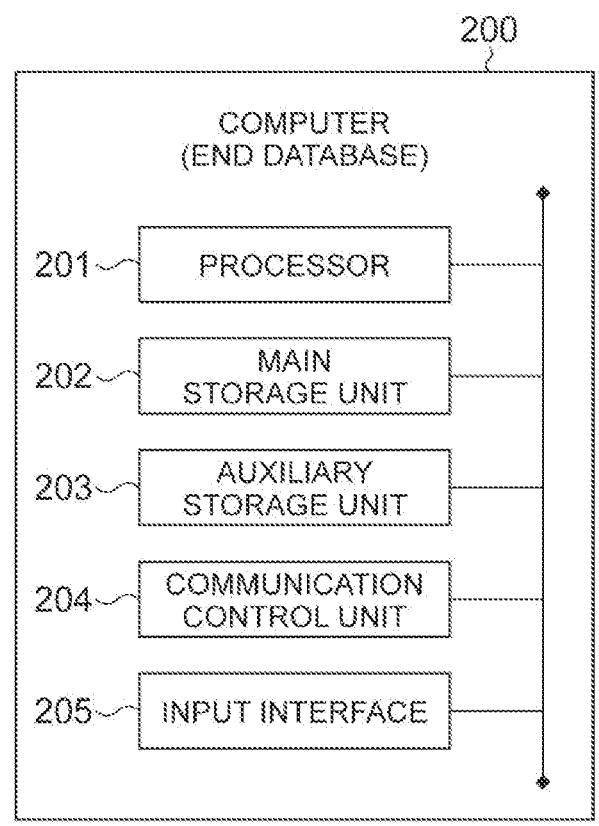
FIG. 7 is a view showing an example of a typical hardware configuration of a computer that constitutes an end database.

FIG. 7 is a view showing an example of a typical hardware configuration of a computer 200 that constitutes the end database 30. For example, the computer 200 includes a processor 201, a main storage unit 202, an auxiliary storage unit 203, a communication control unit 204, and an input interface 205. The processor 201 runs an operating system and an application program. The main storage unit 202 is ROM and RAM, for example. The auxiliary storage unit 203 is a hard disk or a flash memory, for example, and it generally stores a larger volume of data than the main storage unit 202. The tables are built on the auxiliary storage unit 203. The auxiliary storage unit 203 stores a program causing the computer 200 to function as the end database 30. The communication control unit 204 is a network card or a wireless communication module, for example, and it is used for data communication with the primary database 10 or the intermediate database 20. The input interface 205 is an input terminal or a wireless communication module, and it is used for obtaining signals or data from the sensor 90.

The functional elements of the end database 30 are implemented by a program previously stored in the auxiliary storage unit 203. To be specific, the functional elements are implemented by loading the program onto the processor 201 or the main storage device 202 and running this program on the processor 201. The processor 201 makes the communication control device 204 or the input interface 205 operate in accordance with the program, and reads and writes data to and from the main storage device 202 or the auxiliary storage device 203.

The hardware configuration of a computer that constitutes a database is not limited to the above examples. For example, the primary database 10, the intermediate database 20, and the end database 30 may have the same hardware configuration or different hardware configurations.

A program causing a computer to function as the primary database 10, the intermediate database 20, or the end database 30 may be provided in the form of being recorded in a static manner on a tangible recording medium such as CD-ROM, DVD-ROM or semiconductor memory, for example. Alternatively, the program may be provided as a data signal superimposed onto a carrier wave through a communication network.

Each database may be composed of a single computer 100 or 200 or may be composed of a plurality of computers 100 or 200. In the case of using a plurality of computers 100 or 200, those computers 100 or 200 are connected through a communication network such as the Internet or an intranet, and thereby one database is logically constructed.

Figure 8:
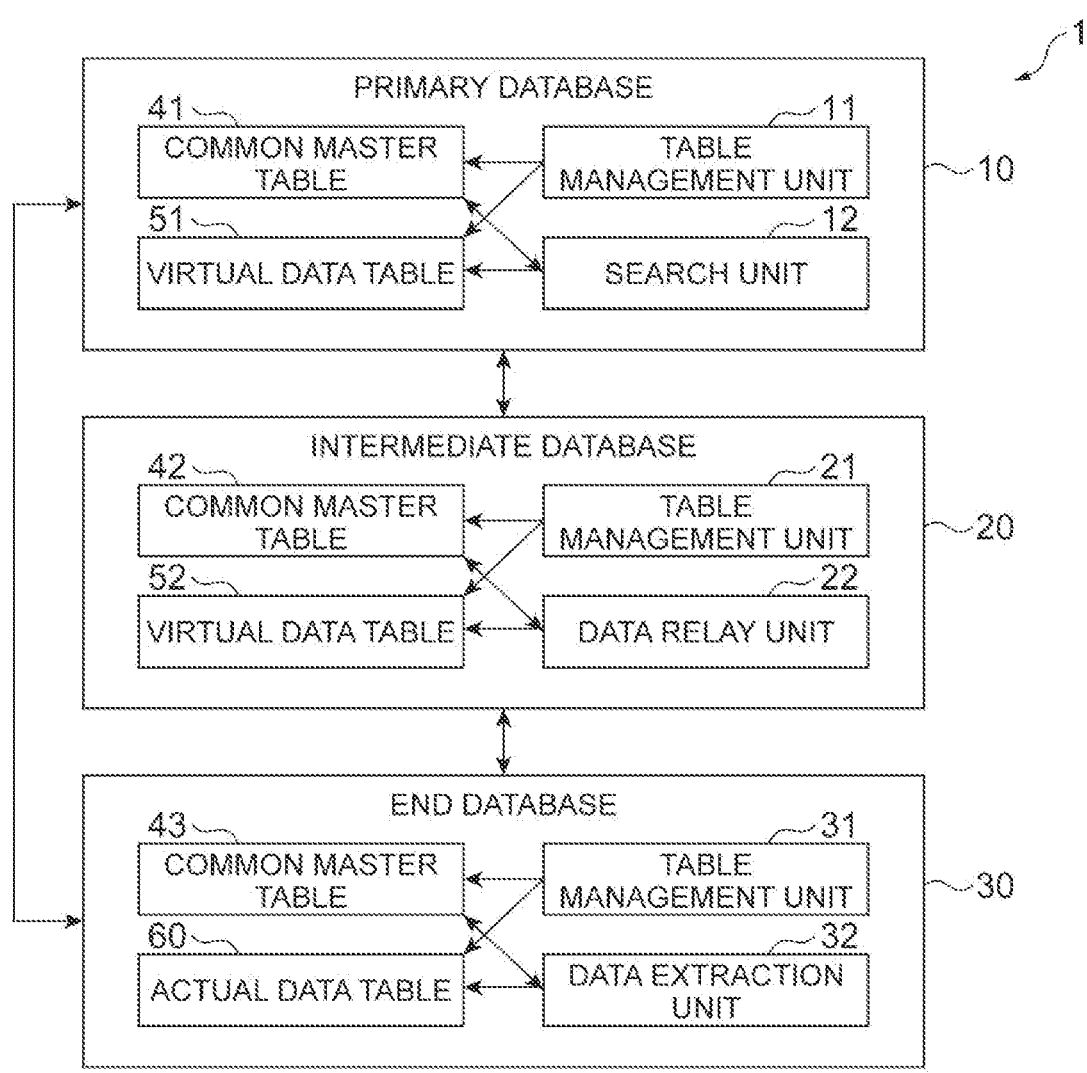
FIG. 8 is a view showing an example of the functional structure of each database.

FIG. 8 is a view showing an example of the functional structure of each database, Hereinafter, the common master table 40 and the virtual data table 50 are denoted by different reference numerals among the primary database 10, the intermediate database 20, and the end database 30 as shown in FIG. 8 according to need.

The primary database 10 includes a table management unit 11 and a search unit 12 as functional elements. The table management unit 11 is a functional element that manages a table in the hierarchical database 2. The search unit 12 is a functional element that searches for sensor data according to a query and outputs a search result onto a virtual data table 51.

The intermediate database 20 includes a table management unit 21 and a data relay unit 22. The table management unit 21 is a functional element that manages a table in the intermediate database 20. The data relay unit 22 is a functional element that acquires data from a database in the immediately lower level for search and outputs the acquired data to a database in the immediately higher level by using a virtual data table 52.

The end database 30 includes a table management unit 31 and a data extraction unit 32. The table management unit 31 is a functional element that manages a table in the end database 30. The data extraction unit 32 is a functional element that extracts sensor data based on search criteria and outputs the extracted data to a database in the immediately higher level by using the actual data table 60.

System Operation

Figure 9:
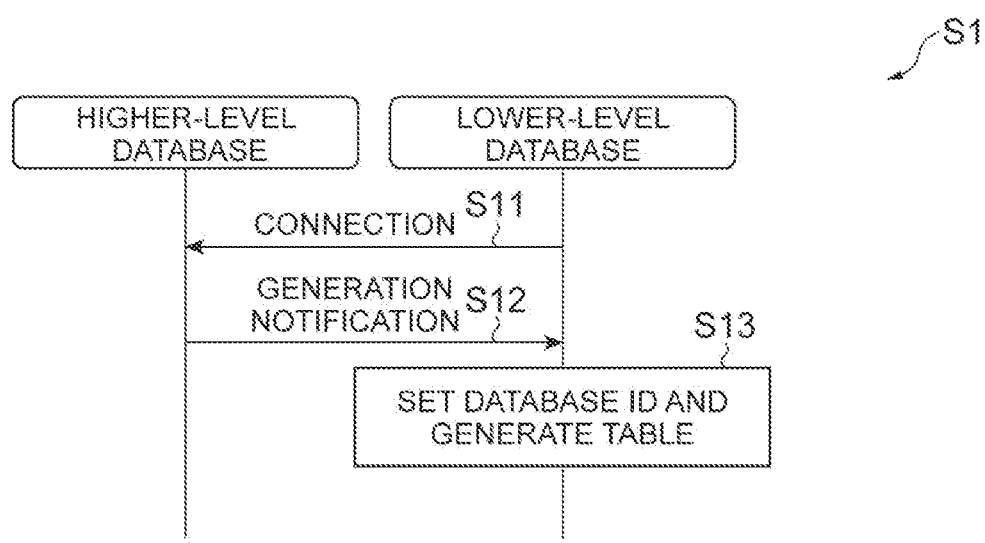
FIG. 9 is a sequence chart showing an example of adding a database.

An example of the operation of the database management system 1 when adding a new database to the hierarchical database 2 is described hereinafter with reference to FIG. 9. FIG. 9 is a sequence chart showing an example of adding a database as a process flow S1. In FIG. 9, a database that is newly added is referred to as a "lower-level database", and a database that is connected to this lower-level database is referred to as a "higher-level database". The higher-level database is located in a level immediately higher than the level of the lower-level database. The higher-level database is the primary database 10 or the intermediate database 20. The lower-level database is the intermediate database 20 or the end database 30.

In Step S11, the lower-level database is connected to the higher-level database.

In Step S12, the table management unit of the higher-level database transmits a generation notification to the lower-level database in response to this connection. This table management unit generates a generation notification indicating the database ID to be assigned to the lower-level database and information about all of the common master tables 40 and all of the virtual data tables 50 implemented in the higher-level database. The information about the common master table contains a table structure, a version number, and master data. The information about the virtual data table contains a table structure. This table management unit transmits the generation notification to the lower-level database.

In Step S13, the table management unit of the lower-level database sets the database ID to the lower-level database, and generates tables in the lower-level database based on the generation notification. This table management unit generates, in the lower-level database, one or more common master tables which are identical to those of the higher-level database and one or more data tables whose data structure is identical to those of the higher-level database. If the lower-level database is the intermediate database 20, the virtual data table 50 is generated, and if the lower-level database is the end database 30, the actual data table 60 is generated.

Figure 10:
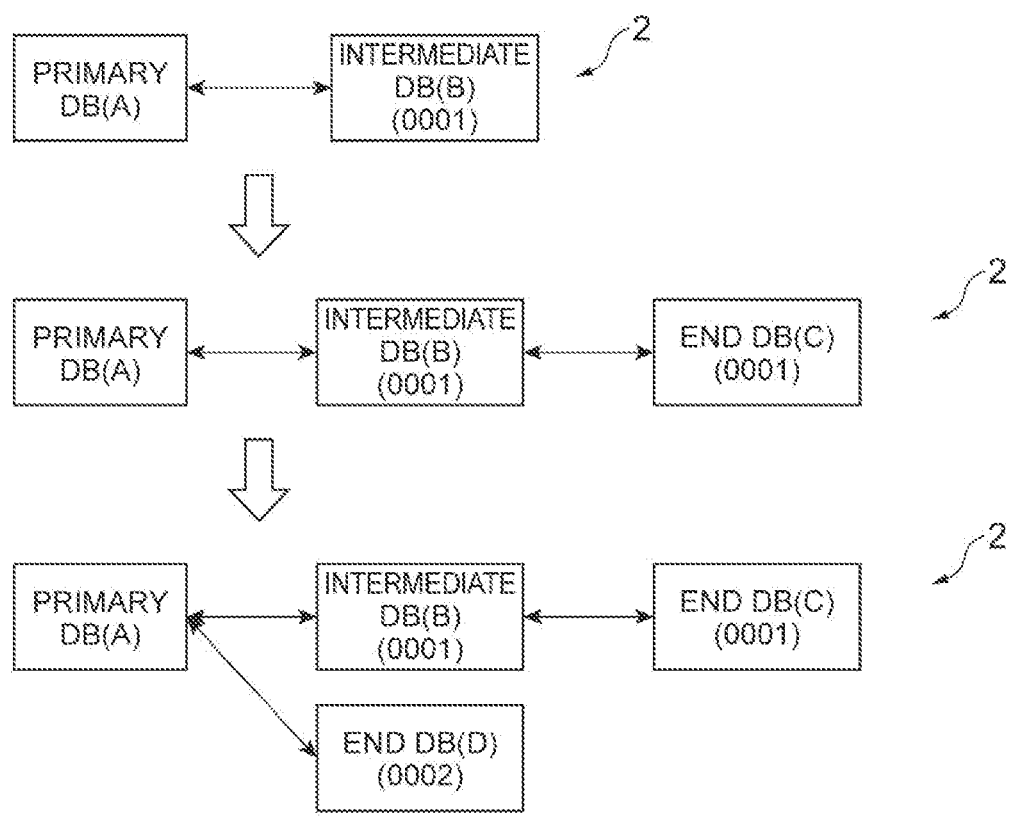
FIG. 10 is a view showing a specific example of adding a database.
Figure 11:
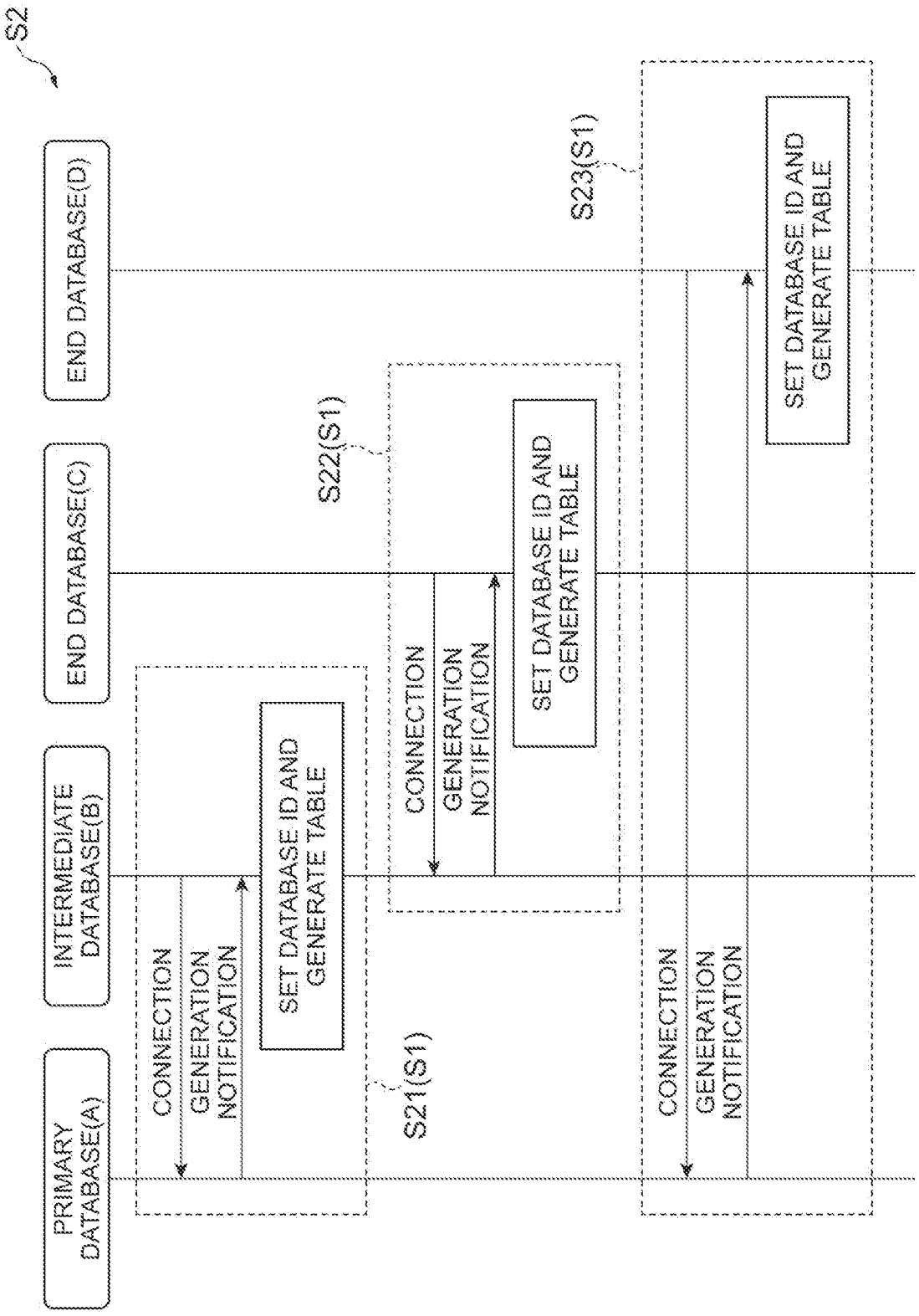
FIG. 11 is a sequence chart showing an example of the operation of a system corresponding to the example in FIG. 10.

A specific example of adding a new database is described hereinafter with reference to FIGS. 10 and 11. FIG. 10 is a view showing a specific example of adding a database. FIG.

11 is a sequence chart showing an example of the operation of the database management system 1 corresponding to this addition as a process flow S2. As shown in FIG. 10, in this example, an intermediate database (B) is first connected to a primary database (A), then an end database (C) is connected to the intermediate database (B), and finally an end database (D) is connected to the primary database (A).

The process flow S2 corresponding to this series of connections is performed as follows. In Step S21, the process flow S1 is performed between the primary database (A) and the intermediate database (B). As a result, the intermediate database (B) includes one or more common master tables 40 which are identical to those of the primary database (A) and one or more virtual data tables 50 whose data structure is identical to those of the primary database (A).

In Step S22, the process flow S1 is performed between the intermediate database (B) and the end database (C). As a result, the end database (C) includes one or more common master tables 40 which are identical to those of the intermediate database (B) and one or more actual data tables 60 whose data structure is identical to those of the intermediate database (B).

In Step S23, the process flow S1 is performed between the primary database (A) and the end database (D). As a result, the end database (D) includes one or more common master tables 40 which are identical to those of the primary database (A) and one or more actual data tables 60 whose data structure is identical to those of the primary database (A).

As shown in the process flow S2, when a new database (lower-level database) is added to the hierarchical database 2, a database (higher-level database) in the immediately higher level transmits a generation notification to the lower-level database in response to this addition. Based on this generation notification, the lower-level database generates the common master table 40 and the data table (the virtual data table 50 or the actual data table 60) corresponding to that of the higher-level database.

An example of adding a new database may be processing of connecting a database that has previously been an element of the hierarchical database 2 to the hierarchical database 2 again. In this case, the table management unit in the higher-level database transmits a generation notification to the added lower-level database in response to this connection. The table management unit in the lower-level database compares the common master table and the data table stored before the connection with the common master table and the data table indicated by the generation notification. Then, the table management unit in the lower-level database regenerates, based on the generation notification, the table whose current structure indicated by the generation notification is different from the structure before the connection, and deletes the table which does not exist in the current structure. This series of process steps allow the lower-level database to function as one functional element of the hierarchical database 2 again.

Figure 12:
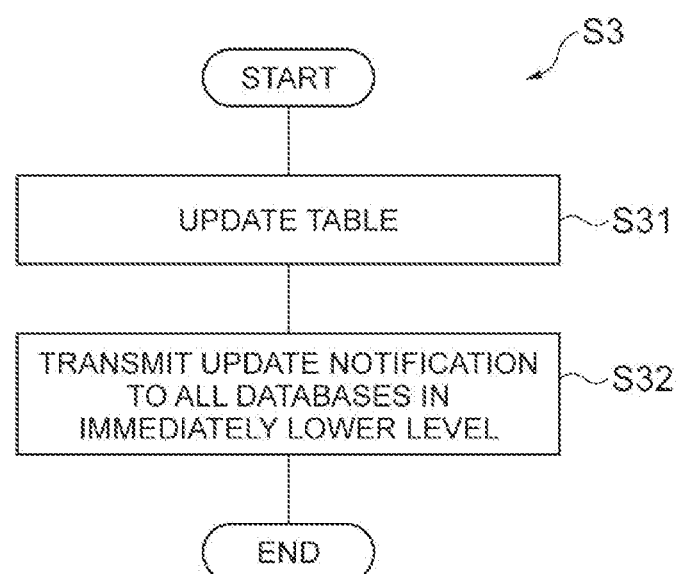
FIG. 12 is a flowchart showing an example of table update in the primary database.
Figure 13:
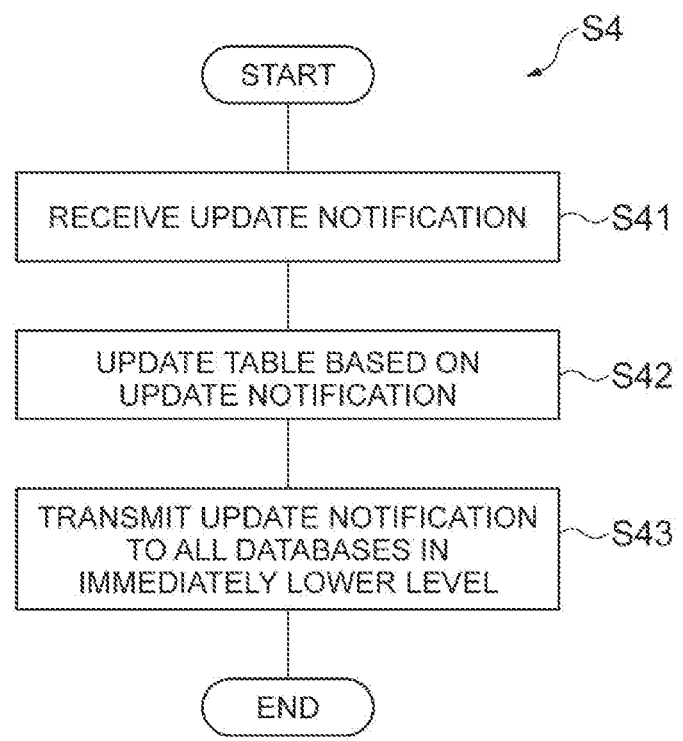
FIG. 13 is a flowchart showing an example of table update in the intermediate database.
Figure 14:
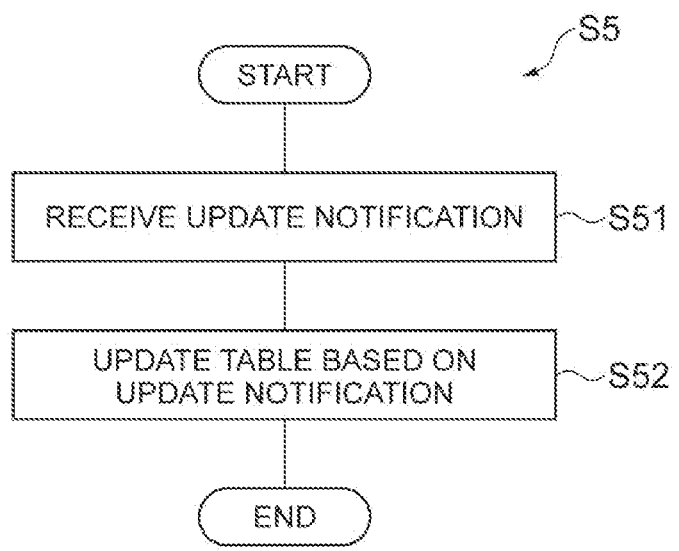
FIG. 14 is a flowchart showing an example of table update in the end database.

An example of a table update process in the database management system 1 is described hereinafter with reference to FIGS. 12 to 14. FIG. 12 is a flowchart showing the operation of the primary database 10 as a process flow S3. FIG. 13 is a flowchart showing the operation of the intermediate database 20 as a process flow S4. FIG. 14 is a flowchart showing the operation of the end database 30 as a process flow S5.

The operation of the primary database 10 is as follows. In Step S31, the table management unit 11 updates at least one table. This processing includes at least one of update of the common master table 41 and update of the virtual data table 51. The update of the common master table is to change at least one of the table structure and the master data. When updating one or more common master tables 41, the table management unit 11 changes the version number of each of the updated common master tables 41 to a new number that has not been used before. The update of the virtual data table is to change the table structure. In Step S32, the table management unit 11 transmits an update notification to all databases in the immediately lower level. The table management unit 11 generates an update notification indicating information about at least one updated table and transmits this update notification. In the case where the common master table 41 is updated, the update notification contains the table structure, the version number, and the master data of the updated common master table 41. In the case where the virtual data table 51 is updated, the update notification contains the table structure of the updated virtual data table 51.

The operation of the intermediate database 20 is as follows. In Step S41, the table management unit 21 receives the update notification from a database in the immediately higher level (the primary database 10 or the intermediate database 20). In Step S42, the table management unit 21 updates at least one table based on this update notification and thereby maintains all of the common master tables 42 and all of the virtual data tables 52 in the intermediate database 20 to be identical to those of the database in the immediately higher level. In Step S43, the table management unit 21 transmits the update notification to all databases in the immediately lower level. This update notification corresponds to the one received in Step S41, and therefore this transmission can be regarded as the transfer of the update notification.

The operation of the end database 30 is as follows. In Step S51, the table management unit 31 receives the update notification from a database in the immediately higher level (the primary database 10 or the intermediate database 20). In Step S52, the table management unit 31 updates at least one table based on this update notification and thereby maintains all of the common master tables 43 and all of the actual data tables 60 in the end database 30 to be identical to those of the database in the immediately higher level.

Figure 15:
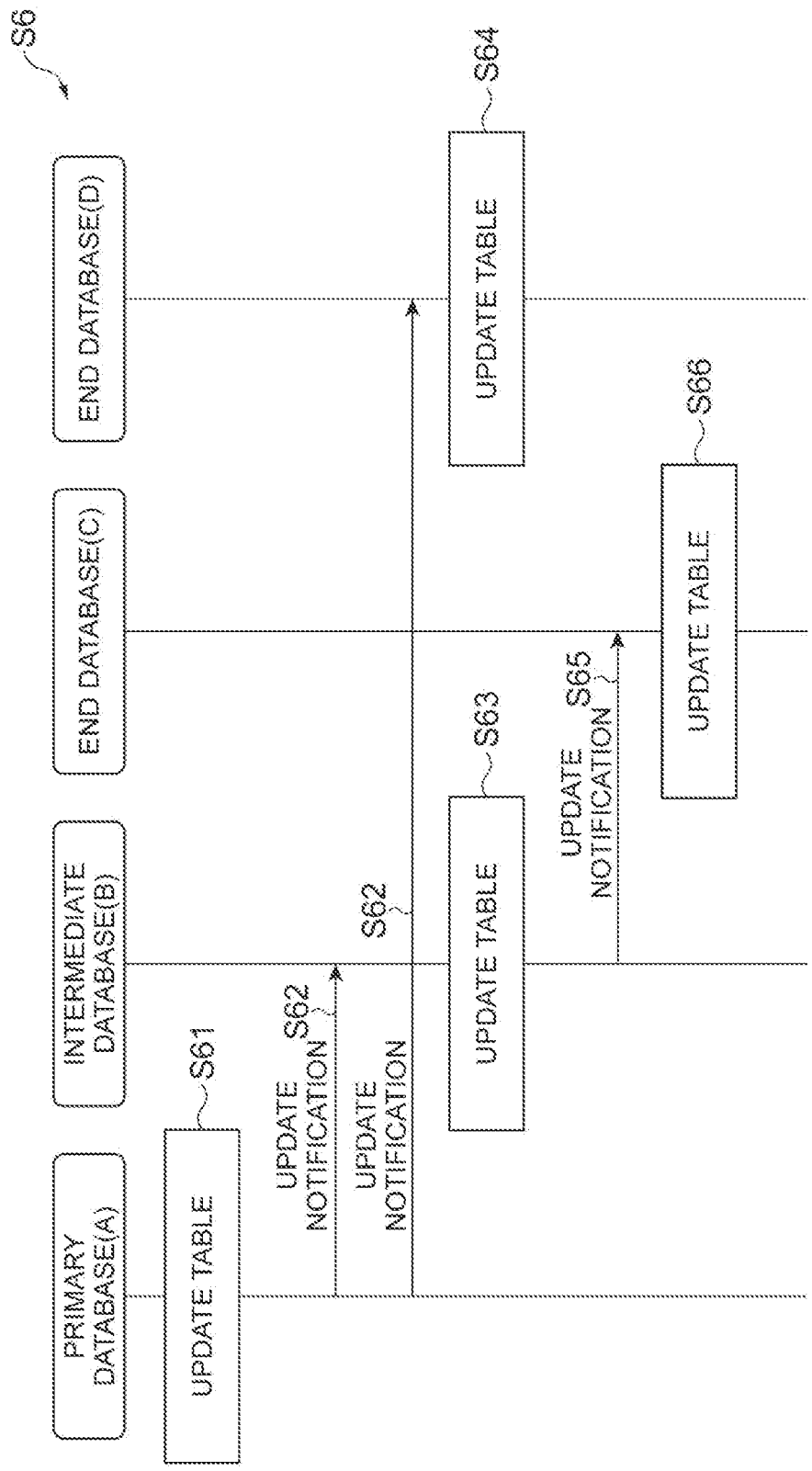
FIG. 15 is a sequence chart showing a specific example of table update.

A specific example of table update is described hereinafter with reference to FIGS. 10 and 15. FIG. 15 is a sequence chart showing a specific example of update of tables in the hierarchical database 2 composed of four databases shown in FIG. 10, as a process flow S6.

In Step S61, the table management unit 11 of the primary database (A) updates a table (at least one of the common master table 41 and the virtual data table 51). In Step S62, the table management unit 11 transmits an update notification to all databases in the immediately lower level, i.e., the intermediate database (B) and the end database (D). The processing in Steps S61 and S62 corresponds to that in the process flow S3.

In Step S63, the table management unit 21 of the intermediate database (B) updates one or more tables (at least one of the common master table 42 and the virtual data table 52) based on this update notification. Step S63 corresponds to Step S42.

In Step S64, the table management unit 31 of the end database (D) updates one or more tables (at least one of the common master table 43 and the actual data table 60) based on this update notification. Step S64 corresponds to Step S52.

In Step S65, the table management unit 21 of the intermediate database (B) transmits (transfers) the update notification to the end database (C). Step S65 corresponds to Step S43.

In Step S66, the table management unit 31 of the end database (C) updates one or more tables (at least one of the common master table 43 and the actual data table 60) based on this update notification. Step S66 corresponds to Step S52.

As shown in the process flow S6, when at least one table is updated in the primary database 10, the update notification is transferred toward each end database 30, and this update is reflected in each database. This processing allows each of the common master tables 40, the virtual data tables 50, and the actual data tables 60 to be identical in the hierarchical database 2.

The deletion of a table can be performed by the same procedure as the update of a table. The table management unit 11 of the primary database (A) deletes at least one table (at least one of the common master table 41 and the virtual data table 51), and transmits a deletion notification indicating this deletion to the database in the immediately lower level (the lower-level database). When the lower-level database is the intermediate database 20, the table management unit 21 deletes at least one table indicated by this deletion notification, and transmits this deletion notification to the database in the immediately lower level. When the lower-level database is the end database 30, the table management unit 31 deletes at least one table indicated by this deletion notification.

Figure 16:
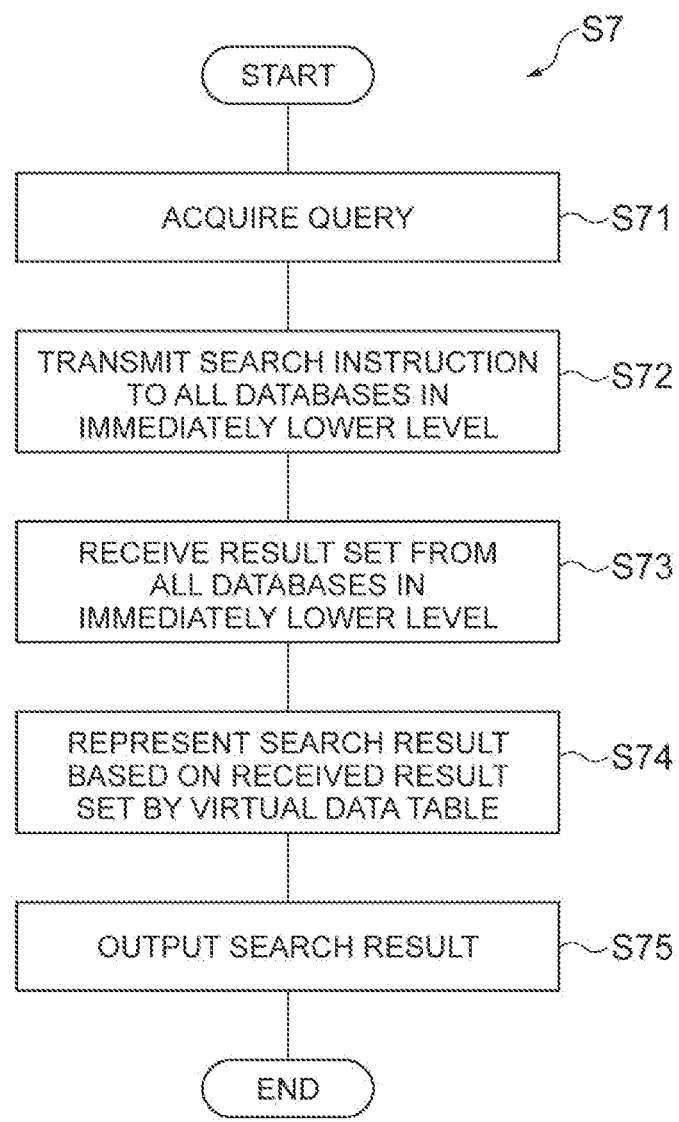
FIG. 16 is a flowchart showing an example of a search process in the primary database.
Figure 17:
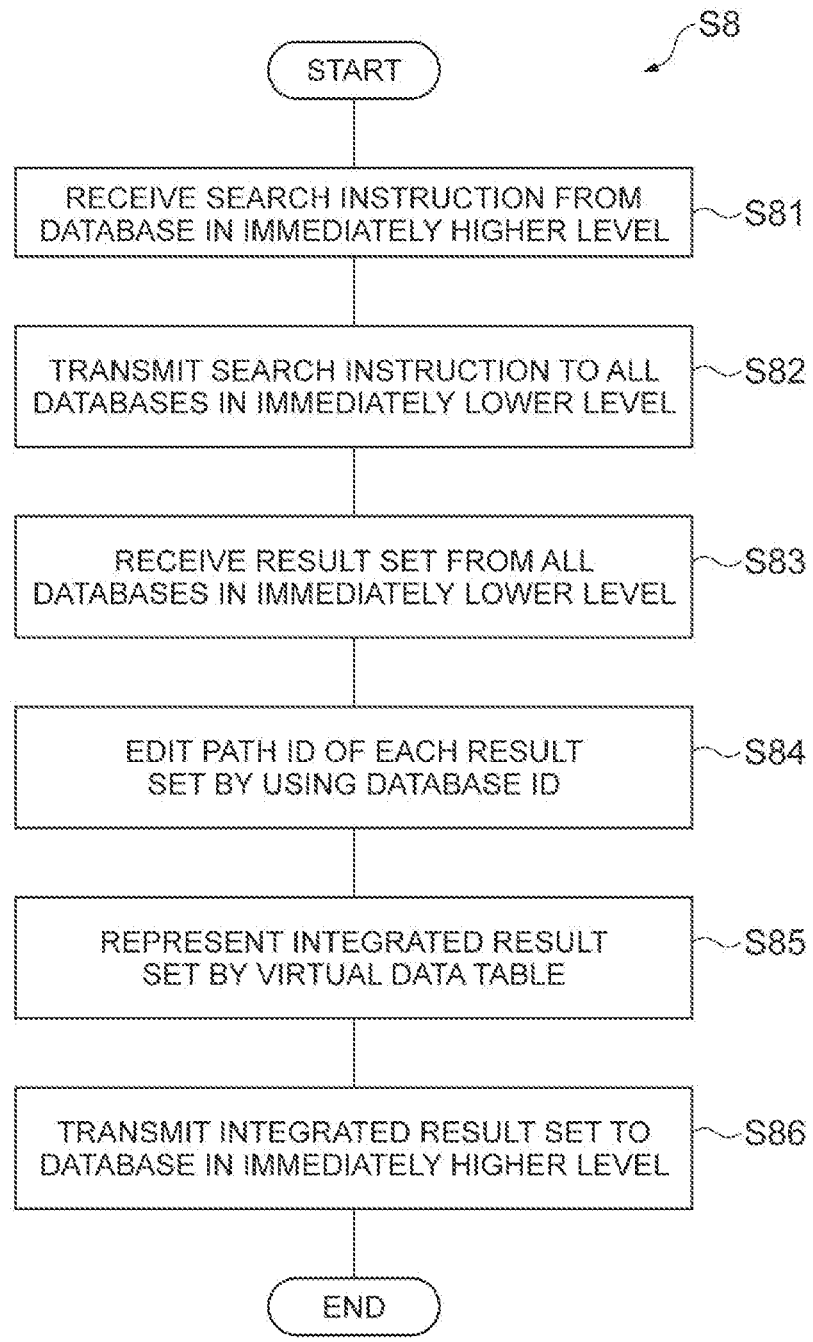
FIG. 17 is a flowchart showing an example of a search process in the intermediate database.
Figure 18:
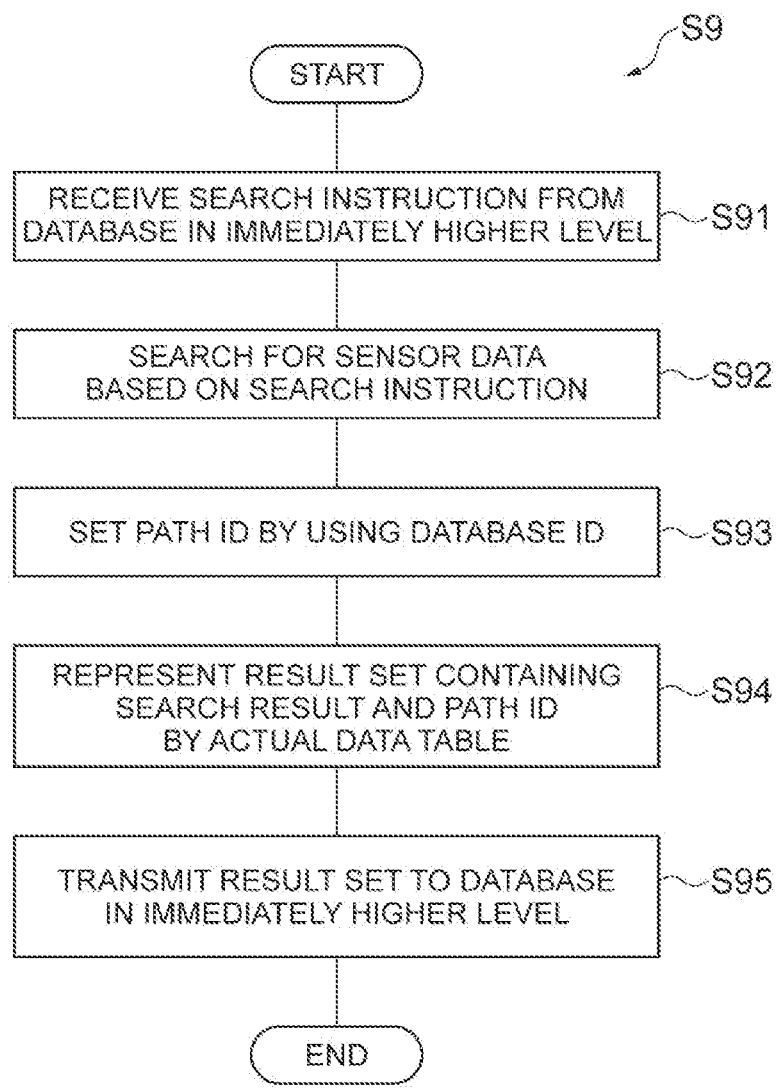
FIG. 18 is a flowchart showing an example of a search process in the end database.

An example of a search process in the database management system 1 is described hereinafter with reference to FIGS. 16 to 18. FIG. 16 is a flowchart showing the operation of the primary database 10 as a process flow S7. FIG. 17 is a flowchart showing the operation of the intermediate database 20 as a process flow S8. FIG. 18 is a flowchart showing the operation of the end database 30 as a process flow S9.

The operation of the primary database 10 is as follows. In Step S71, the search unit 12 acquires a query. The query is a request for data operations on a database, and it is typically represented by a character string in a language such as SQL. It is assumed in this example that the query requests a search for data. A method of acquiring a query is not limited. For example, the search unit 12 may receive a query that is input by a user, may receive a query from another computer, or may read a query previously stored in a storage unit such as the auxiliary storage unit 203.

In Step S72, the search unit 12 transmits a search instruction to all databases in the immediately lower level. The search instruction is an instruction signal for obtaining a result set containing a combination of an intermediate result based on sensor data and a path ID. The intermediate result is a search result in databases in the immediately lower level. The path ID is represented by using one or more database IDs corresponding to one or more databases on the path.

In Step S73, the search unit 12 receives a result set from all databases in the immediately lower level. Each database in the immediately lower level sends a result set in response to the search instruction to the primary database 10. Thus, the result set is a response signal to the search instruction. When a result set is not received from at least one database in the immediately lower level within a specified period of time after transmission of a search instruction, the search unit 12 may forcibly quit waiting for reception and perform the subsequent processing, determining that the result set does not exist.

In Step S74, the search unit 12 represents, by the virtual data table 51, a search result on the basis of the received result set. This means that the search result is represented as data in the virtual data table 51. When representing the search result, the search unit 12 may refer to the common master table 41 and combine the result set and the master data.

In Step S75, the search unit 12 outputs this search result, i.e., the search result represented by the virtual data table 51. A method of outputting the search result is not limited. For example, the search unit 12 may display the search result on a monitor, transmit it to another computer, store it in a storage device, or use it for the subsequent processing.

The operation of the intermediate database 20 is as follows. In Step S81, the data relay unit 22 receives a search instruction from a database in the immediately higher level (the primary database 10 or the intermediate database 20). In Step S82, the data relay unit 22 transmits this search instruction to all databases in the immediately lower level (the intermediate database 20 or the end database 30). In other words, the data relay unit 22 transfers the search instruction from the higher-level database to the lower-level database.

In Step S83, the data relay unit 22 receives a result set from all databases in the immediately lower level. Each database in the immediately lower level sends a result set to the intermediate database 20 in response to the search instruction. Thus, the result set is a response signal to the search instruction. When a result set is not received from at least one database in the immediately lower level within a specified period of time after transmission of a search instruction, the data relay unit 22 may forcibly quit waiting for reception and perform the subsequent processing, determining that the result set does not exist.

In Step S84, the data relay unit 22 edits the path ID of each result set by using the database ID assigned to the intermediate database 20. Each path ID is represented by using the database ID of one or more lower-level databases on one path from one end database 30 to this intermediate database 20. In one example, the path ID is represented as a character string generated by joining one or more database IDs according to the sequence of databases on the path. In one example, the data relay unit 22 joins the assigned database ID with the path ID of the result set and thereby edits this path ID. For example, it is assumed that the database ID of the intermediate database 20 is "0010", and the intermediate database 20 with the database ID "0003" is located in the immediately lower level, and further the end database 30 with the database ID "0002" is located in the level immediately lower than that level. In this case, the path ID of the result set can be "00030002" or "00020003". When the path ID is "00030002", the data relay unit 22 puts "0010" at the head of this character string and thereby changes the path ID to "001000030002". When the path ID is "00020003", the data relay unit 22 puts "0010" at the end of this character string and thereby changes the path ID to "000200030010". In this manner, the data relay unit 22 may join the assigned database ID with the path ID of the result set according to the sequence of databases on the path and thereby edit this path ID.

In Step S85, the data relay unit 22 integrates one or more result sets, and represents the integrated result set by the virtual data table 51. The integration of result sets is processing that generates one result set based on a collection of one or more result sets. The integrated result set is represented as an intermediate result by the virtual data table 52. The integrated result set contains the edited path ID. When representing a search result, the data relay unit 22 may refer to the common master table 42 and combine the result set and the master data.

In Step S86, the data relay unit 22 transmits the integrated result set to the database in the immediately higher level. The transmission may be regarded as a response signal to the search instruction received in Step S81.

The operation of the end database 30 is as follows. In Step S91, the data extraction unit 32 receives a search instruction from a database in the immediately higher level (the primary database 10 or the intermediate database 20).

In Step S92, the data extraction unit 32 searches for sensor data based on the search instruction.

In Step S93, the data extraction unit 32 sets the path ID by using the database ID assigned to the end database 30. In one example, data extraction unit 32 sets the database ID as the path ID.

In Step S94, the data extraction unit 32 represents, by the actual data table 60, the result set containing a combination of the extracted sensor data (i.e., search result) and the path ID. When representing the search result, the data extraction unit 32 may refer to the common master table 43 and combine the result set and the master data.

In Step S95, the data extraction unit 32 transmits the result set to the database in the immediately higher level. This transmission may be regarded as a response signal to the search instruction received in Step S91.

Figure 19:
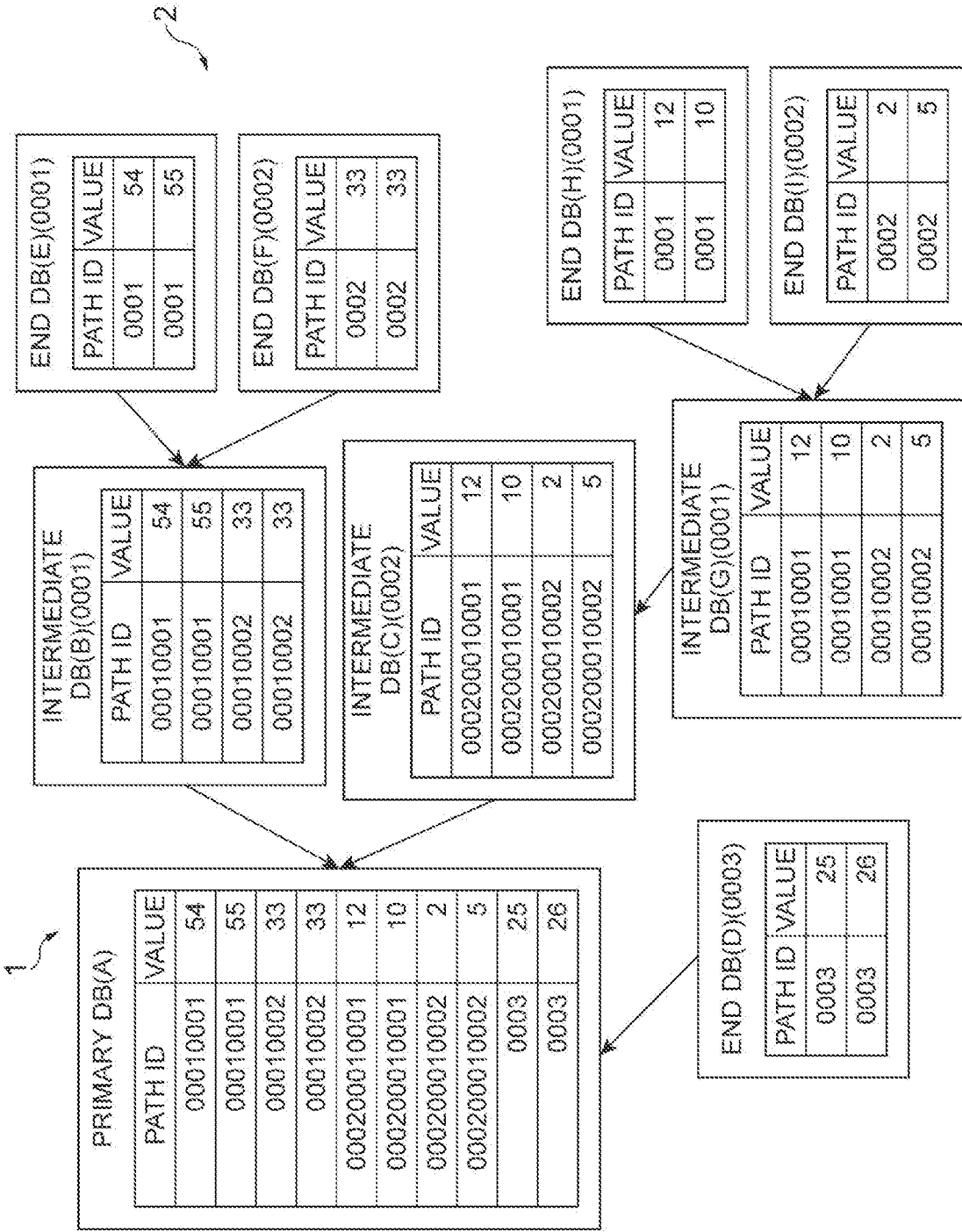
FIG. 19 is a view showing a specific example of a search in the hierarchical database.

A specific example of a search is described hereinafter with reference to FIG. 19. FIG. 19 is a view showing a specific example of a search by the database management system 1. In this example, an intermediate database (B), an intermediate database (C), and an end database (D) are connected in a level immediately lower than the level of a primary database (A). An end database (E) and an end database (F) are connected in a level immediately lower than the level of the intermediate database (B). An intermediate database (G) is connected in a level immediately lower than the level of the intermediate database (C). An end database (H) and an end database (I) are connected in a level immediately lower than the level of the intermediate database (G). In FIG. 19, database IDs are shown in parentheses ("(0001)", "(0002)", etc.).

It is assumed that the search unit 12 of the primary database (A) acquires the query "SELECT R_ID, value FROM V_TBL" under circumstances where sensor data is stored in each end database, as shown in FIG. 19. The character string "R_ID" indicates the path ID, and the character string "V_BL" indicates the name of the virtual data table 51. In response to this query, a search instruction is passed from the primary database (A) to each end database 30 along the paths, and a result set is passed from each end database 30 to the primary database (A). In this example, the intermediate database 20 puts the assigned database ID at the head of the path ID and thereby edits this path ID. Finally the search unit 12 represents, by the virtual data table 51, a final search result composed of 10 records, and outputs this search result.

Figure 20:
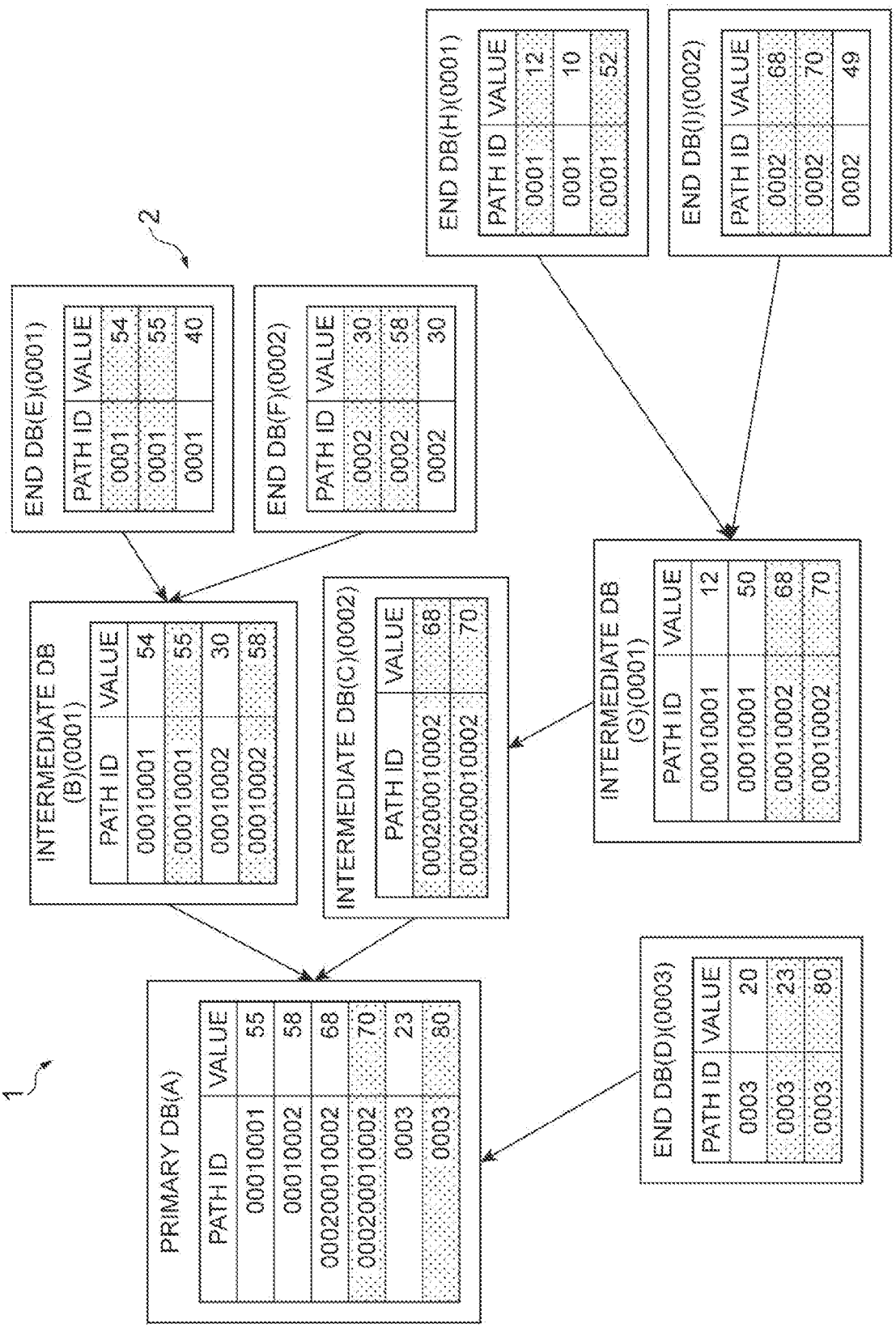
FIG. 20 is a view showing another specific example of a search in the hierarchical database.

Another specific example of a search is described hereinafter with reference to FIG. 20. FIG. 20 is a view showing another specific example of a search in the database management system 1. The hierarchical structure of the hierarchical database 2 is the same as that of FIG. 19. It is assumed that the search unit 12 of the primary database (A) acquires the query "SELECT R_ID, value FROM V_TBL ORDER BY value DESC LIMIT 2" under circumstances where sensor data is stored in each end database, as shown in FIG. 20, The character string "V_TBL" indicates the name of the virtual data table 51. This query means the operation of extracting the top two values when arranged in descending order. In response to this query, a search instruction is passed from the primary database (A) to each end database 30 along the paths, and a result set is passed from each end database 30 to the primary database (A). In this example, there is a possibility that the search unit 12 receives a result set that corresponds only to some of the end databases 30 from databases in the immediately lower level. A method of editing the path ID is the same as in the example of FIG. 19. In FIG. 20, records to be passed to databases in the immediately higher level are shown as shaded. The search unit 12 represents, by the virtual data table 51, a final search result composed of two records corresponding to the top two values in the hierarchical database 2, and outputs this search result. Since only necessary data is transmitted to the higher-level database, the traffic and processing load in the hierarchical database 2 are reduced as a whole.

FIGS. 19 and 20 both show the search result represented by the virtual data table 51 of the primary database 10, the result set (intermediate result) represented by the virtual data table 52 of the intermediate database 20, and the result set represented by the actual data table 60 of the end database 30. In both examples of FIGS. 19 and 20, the primary database (A) is able to identify where each record is generated and through what path it has been sent by referring to the path ID. For example, in the example of FIG. 20, it is identified that the top two values in the hierarchical database 2 are obtained from the end DB (D) and the end DB (I).

Although each records contains the path ID in the examples of FIGS. 19 and 20, a method of associating the path ID with a search result or an intermediate result is not limited. Accordingly, the data structure of a result set and a method for representing a result set are not limited. For example, the path ID may be represented by a data structure different from a record of a search result or an intermediate result.

Advantageous Effects

As described above, a database management system according to one aspect of the present disclosure includes at least one processor configured to control a hierarchical database including a plurality of end databases, each connected to a sensor, and a primary database directly or indirectly connected to the plurality of end databases. Each of the plurality of end databases stores sensor data based on a signal from the sensor. The primary database provides a virtual data table representing a search result based on the sensor data. The at least one processor performs: acquiring a query for obtaining the search result; transmitting a search instruction corresponding to the query to at least one end database among the plurality of end databases, the search instruction being an instruction signal for obtaining a result set containing a combination of an intermediate result based on the sensor data and a path ID being an identifier for uniquely identifying a path connecting the primary database and the end database; receiving at least one result set corresponding to the at least one end database; representing the search result based on the at least one result set by the virtual data table; and outputting the search result represented by the virtual data table.

A database management method according to one aspect of the present disclosure is performed by a database management system configured to control a hierarchical database including a plurality of end databases, each connected to a sensor, and a primary database directly or indirectly connected to the plurality of end databases. Each of the plurality of end databases stores sensor data based on a signal from the sensor. The primary database provides a virtual data table representing a search result based on the sensor data. The database management method includes: acquiring a query for obtaining the search result; transmitting a search instruction corresponding to the query to at least one end database among the plurality of end databases, the search instruction being an instruction signal for obtaining a result set containing a combination of an intermediate result based on the sensor data and a path ID being an identifier for uniquely identifying a path connecting the primary database and the end database; receiving at least one result set corresponding to the at least one end database; representing the search result based on the at least one result set by the virtual data table; and outputting the search result represented by the virtual data table.

A database management program according to one aspect of the present disclosure causes a computer to function as a database management system configured to control a hierarchical database including a plurality of end databases, each connected to a sensor, and a primary database directly or indirectly connected to the plurality of end databases. Each of the plurality of end databases stores sensor data based on a signal from the sensor. The primary database provides a virtual data table representing a search result based on the sensor data. The database management program causes the computer to perform: acquiring a query for obtaining the search result; transmitting a search instruction corresponding to the query to at least one end database among the plurality of end databases, the search instruction being an instruction signal for obtaining a result set containing a combination of an intermediate result based on the sensor data and a path ID being an identifier for uniquely identifying a path connecting the primary database and the end database; receiving at least one result set corresponding to the at least one end database; representing the search result based on the at least one result set by the virtual data table; and outputting the search result represented by the virtual data table.

According to this aspect, sensor data corresponding to a query is collected in the primary database together with a path ID indicating a path connecting the primary database and the end database, and a search result based on this collected sensor data is represented by the virtual data table and output. Since actual sensor data is stored only in the end database, and the primary database represents the search result by the virtual data table, a storage area for storing the actual sensor data is reduced as a whole in the hierarchical database. Further, a source of sensor data, i.e., an information source, is identifiable by the path ID. This architecture enables efficient operations on sensor data.

In the database management system according to another aspect, the path ID may be a character string created using a database ID of the at least one end database. Use of an already existing database ID enables easy generation of a unique path ID.

In the database management system according to another aspect, the hierarchical database may further include an intermediate database located on a path from the primary database to the end database. Providing the intermediate database allows flexible construction of the hierarchical database. Further, since processing is distributed between the intermediate database and the primary database, processing load on the primary database is reduced.

In the database management system according to another aspect, when at least one intermediate database is located on the path, the path ID may be a character string created using a database ID of the end database and each database ID of the at least one intermediate database. Use of an already existing database ID enables easy generation of a unique path ID.

In the database management system according to another aspect, the path ID may be a character string generated by joining a database ID of the end database and each database ID of the at least one intermediate database according to sequence of databases on the path. Joining already existing database IDs according to the tree structure of the hierarchical database enables easy generation of a unique path ID.

In the database management system according to another aspect, all of the primary database, the plurality of end databases, and the intermediate database may include a common master table for storing information necessary for control of the hierarchical database. The common master table may be identical among the primary database, the plurality of end databases, and the intermediate database. The common master table may be associated with a version number indicating a stage of a change in table. Associating a version number with the common master table ensures that the common master table is identical in all databases in the hierarchical database.

In the database management system according to another aspect, each of the plurality of end databases may store the sensor data by using a cyclic table. Use of the cyclic table enables efficient storage of data necessary for processing and reduction of storage capacity needed for the end database.

Modified Example

An embodiment of the present disclosure is described in detail above. However, the present disclosure is not limited to the above-described embodiment. Various changes and modifications may be made to the present disclosure without departing from the scope of the disclosure.

In the above-described embodiment, all databases in the hierarchical database 2 include the common master table 40. Note that, however, the common master table is not an essential element and may be omitted.

In the present disclosure, the description "at least one processor performs the first processing, performs the second processing, . . . , and performs the n-th processing" or the description corresponding thereto indicates a concept including the case where an entity (i.e., a processor) of performing n number of process steps from the first processing to the n-th processing changes during the process. Specifically, this description indicates a concept including both of the case where each processing is performed by the same processor during all of n number of process steps and the case where a processor changes by an arbitrary policy during the n number of process steps.

Further, the procedure of a method that is performed by at least one processor is not limited to the example shown in the above-described embodiment. For example, some of the above-described steps may be omitted, or the steps may be carried out in a different order. Further, any two or more steps of the above-described steps may be combined, or some of the steps may be modified or eliminated. Alternatively, another step may be performed in addition to the above-described steps.

In the comparison of two numerical values, any of the two criteria "equal to or more than" and "more than" may be used, and any of the two criteria "equal to or less than" and "less than" may be used. Selection of the criteria would not change the technical significance regarding the processing of comparing two numerical values.

REFERENCE SIGNS LIST

1 . . . database management system, 2 . . . hierarchical database, 10 . . . primary database, 11 . . . table management unit, 12 . . . search unit, 20 . . . intermediate database, 21 . . . table management unit, 22 . . . data relay unit, 30 . . . end database, 31 . . . table management unit, 32 . . . data extraction unit, 40 to 43 . . . common master table, 50 to 52 . . . virtual data table, 60 . . . actual data table, 90 . . . sensor, 91 . . . sensor data, 92 . . . sensor data

The invention claimed is:

1. A database management system comprising:
at least one processor configured to control a hierarchical database including a plurality of end databases, each connected to a sensor, and a primary database directly or indirectly connected to the plurality of end databases, wherein
each of the plurality of end databases stores sensor data based on a signal from the sensor,
the primary database provides a virtual data table representing a search result based on the sensor data, and
the at least one processor performs:
acquiring a query for obtaining the search result,
transmitting a search instruction corresponding to the query to at least one end database among the plurality of end databases, the search instruction being an instruction signal for obtaining a result set containing a combination of an intermediate result based on the sensor data and a path ID being an identifier for uniquely identifying a path connecting the primary database and the end database,
receiving at least one result set corresponding to the at least one end database,
representing the search result based on the at least one result set by the virtual data table, and
outputting the search result represented by the virtual data table.

2. The database management system according to claim 1, wherein the path ID is a character string created using a database ID of the at least one end database.

3. The database management system according to claim 1, wherein the hierarchical database further includes an intermediate database located on a path from the primary database to the end database.

4. The database management system according to claim 3, wherein, when at least one intermediate database is located on the path, the path ID is a character string created using a database ID of the end database and each database ID of the at least one intermediate database.

5. The database management system according to claim 4, wherein the path ID is a character string generated by joining a database ID of the end database and each database ID of the at least one intermediate database according to sequence of databases on the path.

6. The database management system according to claim 3, wherein
all of the primary database, the plurality of end databases, and the intermediate database include a common master table for storing information necessary for control of the hierarchical database,
the common master table is identical among the primary database, the plurality of end databases, and the intermediate database, and
the common master table is associated with a version number indicating a stage of a change in table.

7. The database management system according to claim 1, wherein each of the plurality of end databases stores the sensor data by using a cyclic table.

8. A database management method performed by a database management system configured to control a hierarchical database including a plurality of end databases, each connected to a sensor, and a primary database directly or indirectly connected to the plurality of end databases, wherein
each of the plurality of end databases stores sensor data based on a signal from the sensor, and
the primary database provides a virtual data table representing a search result based on the sensor data,
the method comprising:
acquiring a query for obtaining the search result;
transmitting a search instruction corresponding to the query to at least one end database among the plurality of end databases, the search instruction being an instruction signal for obtaining a result set containing a combination of an intermediate result based on the sensor data and a path ID being an identifier for uniquely identifying a path connecting the primary database and the end database;
receiving at least one result set corresponding to the at least one end database;
representing the search result based on the at least one result set by the virtual data table; and
outputting the search result represented by the virtual data table.

9. A non-transitory computer-readable storage medium storing a database management program causing a computer to function as a database management system configured to control a hierarchical database including a plurality of end databases, each connected to a sensor, and a primary database directly or indirectly connected to the plurality of end databases, wherein
each of the plurality of end databases stores sensor data based on a signal from the sensor, and
the primary database provides a virtual data table representing a search result based on the sensor data,
the program causing the computer to perform:
acquiring a query for obtaining the search result;
transmitting a search instruction corresponding to the query to at least one end database among the plurality of end databases, the search instruction being an instruction signal for obtaining a result set containing a combination of an intermediate result based on the sensor data and a path ID being an identifier for uniquely identifying a path connecting the primary database and the end database;
receiving at least one result set corresponding to the at least one end database;
representing the search result based on the at least one result set by the virtual data table; and
outputting the search result represented by the virtual data table.

* * * * *